Patented Aug. 14, 1951

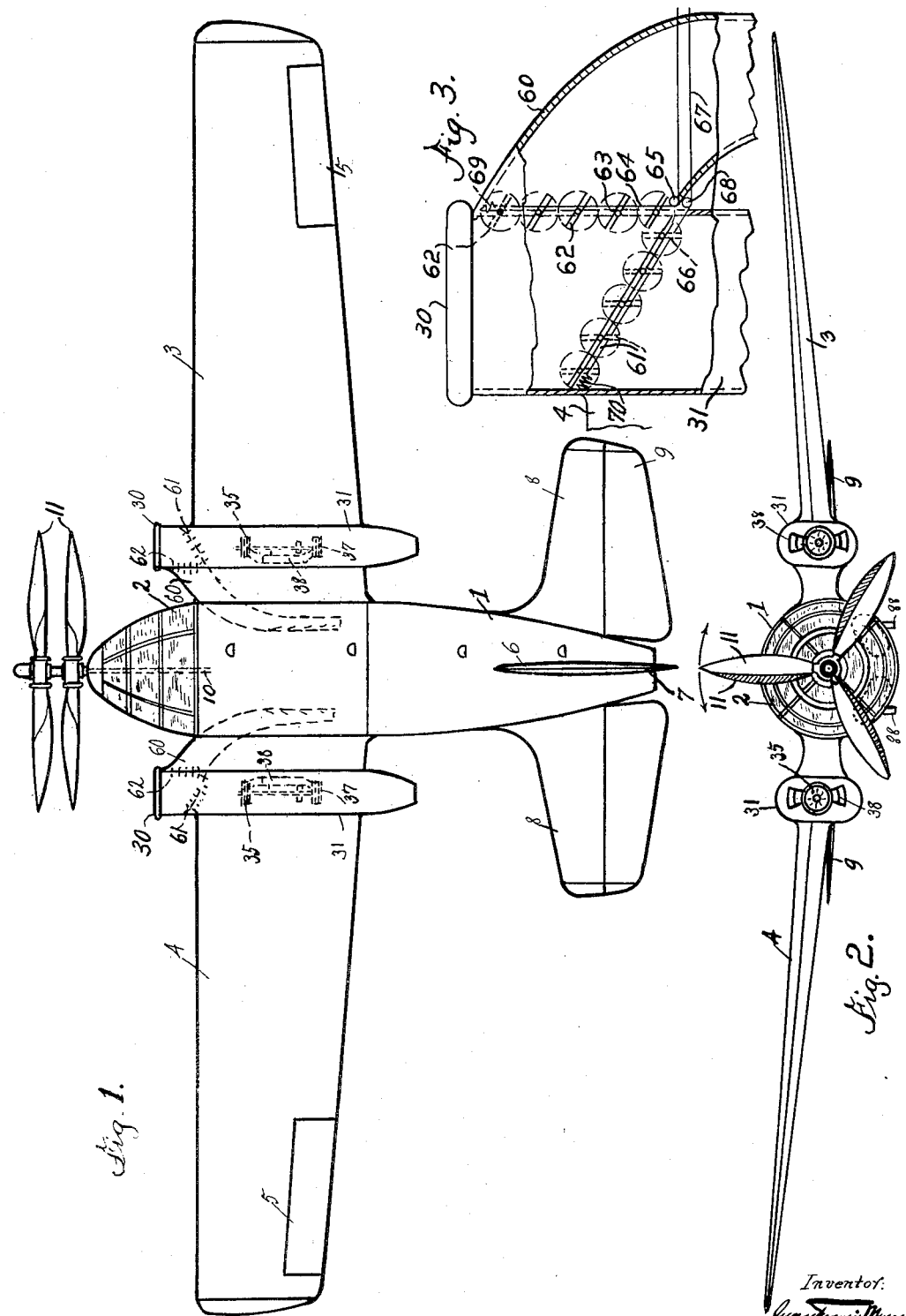

2,564,370

UNITED STATES PATENT OFFICE 2,564,370

AIRCRAFT

George Francis Myers, Jackson Heights, N. Y.

Application March 19, 1945, Serial No. 583,614

1 Claim. (Cl. 170—135.7)

This invention relates to aircraft.

It has for its object to produce an aircraft that can be driven forward either by an engine, as an airplane engine driving one or more airplane propellers, or by one or more jet propulsion devices as ramjets for instance.

Another object is to produce a flying machine having a forward propeller or airscrew, the slipstream therefrom being rammed directly into the tube carrying jet propulsion machinery.

A further object is to produce a machine having the slipstream divertable either to the jet propulsion unit, or to the cylinders of the airplane engine.

The invention also consists of certain other features of construction, and modifications thereof, and in the combination and arrangement of the several parts to be hereinafter described, illustrated in the drawings appended hereto in which similar numerals of references denote similar parts throughout the several views, and then specifically pointed out in the claim.

In the accompanying drawings:

Figure 1 represents a plan view of the machine with the engine thereof mounted in the fuselage.

Fig. 2 is a front elevation of the machine flying through the air and coming straight toward one.

Fig. 3 shows a detail of the valves.

The invention is constructed and operated substantially and preferably as follows: 1 represents the fuselage, 2 the cabin, 3 the right hand wing, 4 the left hand wing, 5 the ailerons, 6 the fin, 7 the rudder, 8 the stabilizer, 9 the elevator, 10 the engine, and 11 the rotor or propeller, either singly or contra-rotating.

30 represents the funnel shaped intake of the thermal jet system and continues rearward in the tube or covering 31 having valves 61, 62 therein. This tube or covering preferably is a complete jet propulsion system unit and is entirely separate from the airplane or helicopter system 35 being the compressor, 37 the turbine and 38 the combustion chamber.

60 represents tubes, more particularly shown in Fig. 3, branching off from the main tubes 31 and extending to the cylinders and other heatable portions of the engine to cool the same; instead of valves being mounted straight across the opening of the mouth of the funnel 30 they are mounted preferably along an oblique line as at 61; also other valves 62 are mounted on the side of the tube or covering (which may be shaped like a square or may be round). Valves 61 when closed permit the blast of air from the slipstream of the propellers to flow onto the engine cylinders and keep them cool; but when the valves 62 are closed the blast will ram into the tube carrying the thermal jet propulsion system.

The valves 61 are all simultaneously operated by the cord 67 attached to short levers 66 mounted on each of the valves 61; the cord running over the pulley 68 and retracted by the spring 70. The valves 62 are all simultaneously operated by the cord 64 attached to short levers 63 mounted on each of the valves 62, the cord running over the pulley 65 and retracted by the spring 69. The cords 64, 67 extend to the cabin 2.

As my invention is in some of its aspects generic, I do not limit myself to the particular construction shown or described, but also contemplate the employment of such equivalents as fairly fall within the scope of the claim.

In this connection it should be noted that; the thermal jet unit may be but a hollow and practically empty streamlined tube or shell with its combustion chamber, or the same may be a tube filled with mechanism comprising a compressor, a combustion chamber and a turbine, or any like unit; the athodyd needs a speed at present of some 400 M. P. H. or the like before it will start to function efficiently, but the slipstream from the propellers will blast or ram into the mouth of the athodyd and start it functioning; therefore a pair of front wheels (not shown) may be added like the front wheels of an airplane; the craft is preferably equipped with three engines: an ordinary airplane engine, the turbo-jet engine or other engine with jet mechanism, and the athodyd or other single tube engine, all of which may be operated simultaneously or used independently.

Therefore it should be understood that various changes may be made in the form, proportion, size, and detail of the several parts shown, the number and position of certain elements used, as well as the character of the motive power employed, without departing from the spirit of the invention.

I claim:

An aircraft comprising an elongated framework, a jet propulsion tube with forward and rearward openings mounted on the framework, an engine also mounted on the framework, a propeller operated by the engine and so arranged in respect to the said tube that it will ram the same with a stream of air, a second tube also having forward and rearward openings mounted with its forward opening connected to said first mentioned tube adjacent to the forward opening of said first mentioned tube and with its rearward opening adjacent to the engine, and valve means mounted in said first mentioned tube adjacent to the forward openings for directing the blast of air from the propeller either through the said first mentioned tube or onto the heated parts of the engine.

GEORGE FRANCIS MYERS.

REFERENCES CITED

The following references are of record in the file of this patent:

UNITED STATES PATENTS

| Number | Name | Date |
|---|---|---|
| 1,032,729 | Baker | July 16, 1912 |
| 1,375,601 | Morize | Apr. 19, 1921 |
| 1,655,114 | Tesla | Jan. 3, 1928 |
| 1,669,495 | Sloan | May 15, 1928 |
| 1,714,917 | Martin | May 28, 1929 |
| 1,888,749 | Urquhart | Nov. 22, 1932 |
| 2,164,545 | Rogers | July 4, 1939 |
| 2,177,499 | Schairer | Oct. 24, 1939 |
| 2,240,747 | Babb | May 6, 1941 |
| 2,280,835 | Lysholm | Apr. 28, 1942 |
| 2,396,911 | Anxionnaz | Mar. 19, 1946 |
| 2,434,085 | Suggs | Jan. 6, 1948 |
| 2,447,100 | Stalker | Aug. 17, 1948 |

FOREIGN PATENTS

| Number | Country | Date |
|---|---|---|
| 11,784 | Great Britain | of 1911 |
| 449,148 | Great Britain | Mar. 15, 1935 |
| 468,063 | Great Britain | June 23, 1937 |
| 548,898 | Great Britain | Oct. 28, 1942 |
| 799,258 | France | Feb. 27, 1936 |
| 870,648 | France | Dec. 22, 1941 |